United States Patent [19]
Tatsuno et al.

[11] Patent Number: 4,789,566
[45] Date of Patent: Dec. 6, 1988

[54] PROCESS FOR COATING A METALLIC SUBSTRATE

[75] Inventors: Tadayoshi Tatsuno, Hiratsuka; Seiji Kashiwada, Yokohama; Komaji Matsui, Hiratsuka; Mituo Wakimoto, Isehara; Ichiro Tabuchi, Atsugi, all of Japan

[73] Assignee: Kansai Paint Co., Ltd., Hyogo, Japan

[21] Appl. No.: 46,942

[22] Filed: May 7, 1987

[30] Foreign Application Priority Data

May 9, 1986 [JP] Japan .................. 61-106418

[51] Int. Cl.$^4$ ............................. B05D 3/02
[52] U.S. Cl. .................. 427/388.2; 427/407.1; 427/386; 427/195
[58] Field of Search ............... 427/388.2, 407.1, 195, 427/386

[56] References Cited

U.S. PATENT DOCUMENTS

| 4,139,672 | 2/1979 | Ozawa et al. | 427/195 |
| 4,220,675 | 9/1980 | Imazaki | 427/195 |
| 4,403,003 | 9/1983 | Backhouse | 427/407.1 |
| 4,477,536 | 10/1984 | Wright et al. | 427/407.1 |
| 4,508,767 | 4/1985 | Hokamura et al. | 427/386 |
| 4,568,568 | 2/1986 | Asano et al. | 427/388.2 |

Primary Examiner—George F. Lesmes
Assistant Examiner—L. R. Horne
Attorney, Agent, or Firm—Wenderoth, Lind & Ponack

[57] ABSTRACT

A process for coating a metallic substrate, which comprises applying an electrocoating paint to a metallic substrate, then applying a barrier coating comprising a crosslinking hardenable resin and being capable of forming a barrier coat film having an elongation at break of at least 150% and a stress at break of at least 20 kg/cm$^2$ to the electrocoated film, optionally applying an intermediate coating paint to the barrier coat, and finally applying a top coating paint to the barrier coat or the intermediate coat.

23 Claims, No Drawings

PROCESS FOR COATING A METALLIC SUBSTRATE

This invention relates to a process for coating a metallic substrate. More specifically, it relates to a process for coating a metallic substrate such as a steel panel constituting an automotive body to form thereon a composite coated film having excellent chipping resistance, corrosion resistance, interlayer adhesion, surface appearance and other physical properties.

The electrocoating paint used in a composite coating system consisting of an electrocoating and a top coating is advantageous from the standpoint of solution control and resources saving because it contains little organic solvent and has an excellent coating efficiency. A composite coated film obtained by the composite coating system, however, has unsatisfactory chipping resistance, corrosion resistance, interlayer adhesion and surface appearance, and it has been desired to improve these properties.

In automobile coatings, the durability of coated films on automotive outer bodies, and particularly the progress of corrosion in the metallic substrates of the outer bodies owing to impact peeling known as "chipping" have recently been considered to be important problems to solve. In the cold climatic districts of Europe and America, for example, pebbles mixed with a large quantity of rock salt ground to relatively coarse paricles are often laid on motor vehicle roads in winter to prevent surface freezing. While automobiles are running on such roads, the coated films on their outer portions are hit by the rock salt particles and pebbles flipped by the wheels, and this impact of collision often causes an impact peeling phenomenon, known as "chipping", in which the coated films locally peel completely from the outer bodies. As a result, the surface of the metallic substrate beneath the hit areas is exposed and rapidly develops rust and corrosion. The peeling of the coated films by chipping ordinarily occurs more in the bottom and underbody portions of the automobiles but also occurs on the hoods. The consequent local corrosion is known to grow to a considerable degree in about six months to one year.

In order to prevent the chipping of the coated films and the consequent progress of corrosion in the metallic substrate constituting the automotive body, various invesigations have been undertaken in the art in respect to the chemical treatment of the substrate and in respect to the electrocoating paints and top coating paints to be applied to the surface of the metallic substrate. For example, with regard to the chemical treatment, the formation of an iron phosphate-type film and a zinc phosphate-type film having different crystal forms have been studied. By such a method, however, it is difficult to improve the adhesion of the coated film at those parts of the substrate which may undergo chipping. Furthermore, in an attempt to improve the electrocoating paints and the top coating paints, resins and pigments as components of such paints have extensively been investigated, but to date, no satisfactory paints effective for improving film adhesion sufficient to withstand chipping have emerged from such investigations.

The present inventors have made extensive investigations in order to eliminate the above-mentioned drawbacks of the prior art and to provide a process for coating a metallic substrate, particularly a steel panel, to form thereon multi-layered coated film composed of an electrocoated primer and top coat and having excellent chipping resistance, corrosion resistance, interlayer adhesion, weather resistance and other physical properties. Yet the coatings of the present invention retain a good film appearance as possessed by conventional coating systems for steel panels comprising an electrocoating paint and a top coating paint. These investigations have now led to the present invention.

According to the present nention, there is provided a process for coating a metallic substrate, which comprises applying an electrocoating paint to a metallic substrate, then applying a barrier coating comprising a crosslinking hardenable resin and being capable of forming a barrier coat film having an elongation at break of at least 150% and a stress at break of at least 20 kg/cm$^2$ to the electrocoated film, optionally applying an intermediate coating paint to the barrier coat, and finally applying a top coating paint to the barrier coat or the intermediate coat.

An important characteristic feature of the present invention is that in a process for coating a metallic substrate, particularly a steel panel, with an electrocoating paint, an optional intermediate coating paint and a top coating paint in this order, a barrier coat having a particular composition and particular properties is applied to the electrocoated film prior to application of the intermediate coat or the top coat. The application of this barrier coat leads to the formation of a composite coated film having excellent chipping resistance, corrosion resistance, interlayer adhesion, weather resistance and other physical properties.

The barrier coated film contained in the middle of the composite coated film formed by the process of the invention has a high elongation and excellent flexibility or elasticity. Hence, even when the surface of the top coated film over the barrier coat undergoes a strong impact with rock salt, pebbles, etc., the energy of impact is mostly or completley absorbed by the barrier coat and does not reach the electrocoated film beneath the barrier coat. Morevoer, even the top coated film and the optional intttermediate coated film undergo little physical damage. In other words, the barrier coat has a buffer action against external impacts, which enables the chipping resistance of the coated film to be markedly improved and prevents not only development of rust and corrosion in steel panels by chipping but also deterioration of the top coated film by collision of rock salt, pebbles, etc.

When the barrier coat contains a corrosion inhibiting pigment, the resulting composite coated film has significantly improved corrosion resistance over the case of including the pigment in the electrocoated film.

The composite coated film formed by the process of the invention is also excellent in such characteristics as film appearance, interlayer adhesion, weather resistance and chemical resistance.

The coating process according to the present invention will be described in detail below.

Metallic substrate

By the metallic substrate is meant the substrate material to be coated according to the present invention process. As the metallic substrate to which the process of the invention is applicable, there can be used any materials having a metal surface to which a cation electrocoating paint can be applied. Such materials include, for example, shaped articles made of iron, copper, aluminum, tin, zinc or an alloy thereof as well as products having a plated or deposited film of such a metal or alloy. A steel panel is particularly preferred. Specifically, there are mentioned bodies and parts made of these materials, of passenger cars, trucks, safari cars, motor bicycles, etc. Preferably the surfaces of these metallic substrates are subjected to a chemical treatment with a phosphate, a chromate or the like prior to the application of a cation type electrocoating paint.

Electrocoating paint

This electrocoating paint refers to the electrocoating paint to be applied to the surface of the above metallic substrate. As the electrocoating paint, both an anion type and a cation type can be used. The electrocoating paint of the cation type is preferred.

[A] The cation type electrocoating paints include thermosetting electrocoating paints of the cathodic deposition type wherein a base resin having basic amino groups is neutralized with an acid and dissolved (or dispersed) in water. These paints are coated on a metallic substrate using the substrate as a cathode.

As the resin having basic amino groups, there are suitably used resins generally having a base value of about 2% to about 200 obtained by, for example, (1) the addition of an amine to epoxy groups (oxirane rings) of an epoxy group-containing resin such as a bisphenol type epoxy resin, an epoxy group-containing (or glycidyl group-containing) acrylic resin, a glycidyl ether of an alkylene glycol, an epoxidized polybutadiene, an epoxidized novolak phenol resin or the like; (2) polymerization using, as a monomer, an unsaturated compound having basic amino groups such as N,N-dimethylaminoethyl methacrylate, N,N-diethylaminoethyl acrylate, N-vinylpyrazole or the like; (3) reaction of a polyisocyanate compound with a glycol containing, as one component, a tertiary amino group-containing glycol (e.g. N-methyldiethanolamine); and (4) introduction of amino groups into a resin by an imidoamine formation reaction between an acid anhydride and a diamine.

The base value of a resin is mg of KOH corresponding to the equivalent of HCl required to neutralize 1 g of the resin.

As the amine used in the above reaction (1), there can be mentioned primary amines, secondary amines and tertiary amine salts of aliphatic type, alicyclic type and araliphatic type. Onium salts obtained by adding to the epoxy group-containing resin mentioned in (1), a secondary sulfide salt or a tertiary phosphine salt in place of the amine can also be used in the present invention as a vehicle component of the cation type electrocoating paint.

As the neutralizing agent to neutralize the resin having basic amino groups to dissolve (or disperse) the resin in water, there can be used, for example, organic acids such as acetic acid, hydroxyacetic acid, propionic acid, butyric acid, lactic acid, glycine and the like as well as inorganic acids such as sulfuric acid, hydrochloric acid, phosphoric acid and the like. The appropriate amount of the neutralizing agent to the resin is about 0.1 to about 0.4 times the neutralization equivalent for the base value of the resin (generally about 20 to about 200).

A blocked polyisocyanate compound is generally used as the crosslinking agent incorporated in the cation-type electrocoating paint to make it thermosetting. When the electrocoating paint is coated on a substrate and heated (ordinarily to 140° C. or a higher temperature), the crosslinking agent causes dissociation, whereby the isocyanate groups are regenerated and cause a crosslinking reaction with active hydrogen-containing functional groups (e.g. hydroxyl group) present in the resin having basic amino groups. Thus, the electrocoating paint coated becomes a cured film.

[B] The anion type electrocoating paints include electrocoating paints of anodic deposition type wherein a base which is a carboxyl group-containing resin in most cases is neutralized with a basic compound and dissolved (or dispersed) in water. These paints are coated on a metallic substrate using the substrate as an anode.

As the carboxyl group-containing resin, there can be mentioned, for example, (1) maleinized oil resins obtained by addition of maleic anhydride to a drying oil (e.g. linseed oil, dehydrated castor oil, tung oil), (2) maleinized polybutadienes obtained by addition of maleic anhydride to a polybutadiene [e.g. a poly(1,2-butadiene), a poly(1,4-butadiene)), (3) resins obtained by addition of maleic anhydride to an unsaturated fatty acid ester of an epoxy resin, (4) resins obtained by addition of a polybasic acid (e.g. trimellitic anhydride, a maleinized fatty acid, a maleinized oil) to a high molecular polyalcohol having a molecular weight of about 1,000 or more (includes even partially esterified epoxy resins and styrene/allyl alcohol copolymers), (5) carboxyl group-containing polyester resins (include even such resins modified with a fatty acid), (6) carboxyl group-containing acrylic resins and (7) resins obtained by addition of maleic anhydride to a (co)polymer formed from a reaction product between (a) a polymerizable unsaturated monomer having a glycidyl group or a hydroxyl group and (b) a unsaturated fatty acid. Of these resins, those having a carboxyl group content of about 30 to 200 when expressed as an acid value are suitable.

As the neutralizing agent used for neutralizing the carboxyl group of the carboxyl group-containing resin to make the resin soluble (or dispersible) in water, there can be used, for example, alkanolamines such as monoethanolamine, diethanolamine, dimethylaminoethanol and the like; alkylamines such as diethylamine, triethylamine and the like; and inorganic alkalis such as potassium hydroxide, sodium hydroxide and the like. The appropriate amount of the neutralizing agent used is about 0.1 to 1.0 times, preferably 0.4 to 0.8 times, the theoretical neutralization equivalent for the acid value of the carboxyl group-containing resin.

In order to provide the anion type electrocoating paint with curability, a low molecular melamine resin such as hexakismethoxymethylmelamine, butoxylated methylmelamine, ethoxylated methylmelamine or the like can be added to the paint as a crosslinking agent as necessary.

[C] Into the above mentioned cation or anion type electrocoating paint usable in the present invention are further incorporated, if necessary, pigments, hydrophilic organic solvents (e.g. isopropanol, n-butanol, ethoxyethanol, diethylene glycol monomethyl ether, diethylene glycol monoethyl ether, diethylene glycol monobutyl ether), and ordinarily used additives. The resulting mixture is adjusted with deionized water so as to have a solids content of about 5 to about 40% by weight and its pH is kept at 5.5 to 8.0 in the case of the cation type electrocoating paint and at 7 to 9 in the case of the anion type electrocoating paint.

The electrocoating paint thus prepared is subjected to electrocoating. It is usually conducted under conditions of 15° to 35° C. (bath temperature) and 100 to 400 V (load voltage) using a metallic substrate as a cathode in the case of the cation type electrocoating paint or as an anode in the case of the anion type electrocoating paint. The electrocoating film thickness is not particularly restricted and can vary largely depending upon the application of finished product, etc. Preferably, however, the thickness is generally 10 to 40μ, particularly 15 to 35μ in terms of cured film thickness of flat portions. The baking and curing temperature for the coated film is suitably 100° to 210° C. generally, and preferably 140° to 200° C. However, when an anion type coating paint containing an air-drying, unsaturated fatty acid-modified resin as a vehicle is used in electrocoating, the resulting coating film may be dried at room temperature.

Metallic substrates, for example, automotive bodies contain many acute-angled portions of steel panel such as the sides, bottom and back of facia, fenders, door panels, panel hoods, panel roofs, panel trunk lids and bodies. Unlike other flat portions, these acute-angled portions have an acute-angled or projected shape. At such portions, paints do not ahdere sufficiently and, once adhered, melt-flow during heat curing. Therefore, the film thickness inevitably gets smaller at the acute-angled portions as compared with that of flat portions, and, especially at very acute-angled portions, the film thickness becomes extremely small. As a result, the acute-angled portions have far inferior corrosion resistance to the flat portions and rust tends to occur easily firstly in the acute-angled portions. In contrast, when the process of the invention is carried out using a cation or anion type electrocoating paint containing a high concentration of pigments, the electrocoating paint adheres sufficiently even to the acute-angled portions and fine uneven portions present on the surface of the electrocoating film are filled by a barrier coat (to be described later), whereby the penetration of a top coating paint can be prevented and a coating system having improved surface smoothness, distinctness of image gloss, corrosion resistance, chipping resistance of acute-angled portions, etc. can be obtained.

The amount of the pigment incorporated in the electrocoating paint in order to obtain such a coating system is more than in normal cases and specifically is 40 to 150 parts by weight, preferably 55 to 100 parts by weight, more preferably 60 to 85 parts by weight, per 100 parts by weight of resin solid. Needless to say, there can also be used in the present invention an amount less than 40 parts by weight, ordinarily 35 parts by weight or less based on 100 parts by weight of resin solid which hitherto has been used generally. The pigments usable in the electrocoating paint are not particularly restricted in type and include color pigments, extender pigments, corrosion-inhibiting pigments, etc. which are all known. As such pigments, there can be mentioned, for example, zinc oxide, antimony white, basic lead sulfate, basic lead carbonate, titanium dioxide, lithopone, lead silicate, zirconium oxide, carbon black, graphite, black iron oxide, aniline black, cuprous oxide, cadmium red, chrome vermilion, red iron oxide, pigment red, pigment violet, pigment orange, basic lead chromate, chrome yellow, ocher, cadmium yellow, strontium chromate, titanium yellow, litharge, pigment yellow, pigment green, zinc green, chrome green, chromium oxide, Phthalocyanine Green, ultramarine, prussian blue, Phthalocyanine Blue, pigment blue, cobalt violet, pigment violet, zinc powder, zinc oxide, red lead, lead cyanide, calcium plumbate, zinc yellow, silicon carbide, aluminum powder, asbestine, alumina, clay, diatomaceous earth, slaked lime, gypsum, talc, barium carbonate, precipitated calcium carbonate, calcium carbonate, precipitated barium sulfate, barite, bentonite, white carbon, glass beads, etc. These pigments can be used alone or in a combination of two or more.

Barrier coat

This is a composition for forming an intermediate buffering or cushioning layer for absorbing an energy of impact by rock salt particles and the like and is applied to the surface of the electrocoating paint already applied. The barrier coat may be formed of a coating composition composed mainly of a crosslinking hardenable resin and being capable of forming a barrier coated film having an elongation at break of at least 150% and a stress at break of at least 20 kg/cm$^2$. The barrier coating composition is a coating composition containing an organic solvent as a solvent or a dispersing medium prepared by blending the crosslinking hardenable resin and the organic solvent as main components and as required, a viscosity imparting agent, a pigment such as a colored pigment or a body extender pigment, an ultraviolet absorber, a light stabilizer, an antioxidant, etc.

The crosslinking hardenable resin used as a vehicle resin in the barrier coat preferably has excellent adhesion not only to the electrocoated film but also to an intermediate or a top coated film to be described hereinafter and can form a barrier coat having an elongation at break and a stress at break within the above-mentioned ranges. The crosslinking hardenable resin reacts itself or in the presence of a crosslinking agent at room temperature or an elevated temperature to form a three-dimensional crosslinkage. Specific examples of the crosslinking hardenable resin are shown below.

(1) Polybutadiene-containing crosslinkable resin compositions

They include a crosslinkable composition comprising (i) polybutadiene having a number average molecular weight of about 10,000 to about 1,000,000 and having functional groups selected from amino, hydroxyl and carboxyl groups introduced into both ends, or a butadiene/acrylonitrile copolymer having an acrylonitrile content of about 1 to about 50% by weight and a number average molecular weight of about 10,000 to about 1,000,000 and (ii) at least one resin as a curing agent selected from epoxy resins, urethane resins, polyester resins and melamine resins. The mixing ratio between the polybutadiene or butadiene/acrylonitrile copolymer and the curing agent is not strictly limited. Generally, the crosslinking agent is used suitably in an amount of about 10 to about 60 parts by weight, preferably 20 to 40 parts by weight, per 100 parts by weight of the polybutadiene-containing resin. The above composition reacts and cures at room temperature or an elevated temperature depending upon the type of the curing agent. A barrier coat having the above properties can be easily formed from the above composition by properly selecting the molecular weight of the polybutadiene or the butadiene/acrylonitrile copolymer, and the type and amount of the crosslinking agent.

(2) Thermosetting polyester resin compositions

They include a mixture of (i) a urethane-modified polyester resin obtained by polycondensation by an ordinary method an acid component comprising a dibasic acid containing two carboxyl groups per molecular and being free from a polymerizable unsaturation as a main component and an alcohol component composed of a dihydric alcohol being free from a polymerizable unsaturation and a small amount of a trihydric or tetrahydric alcohol to produce polyesters having a relatively low molecular weight (number average molecular weight preferably in the range of about 500 to about 10,000), and extending the chains of the resulting polyester to 2 to 50 times by reaction with a diisocyanate compound, and (ii) a blocked polyisocyanate compound as a crosslinking agent. Suitably, the urethane-modified polyester resin has a hydroxyl value of generally about 20 to about 100, preferably 40 to 80.

Preferably, the dibasic acid used for polyester formation is an aliphatic saturated dibasic acid having 4 to 34 carbon atoms such as succinic acid, glutaric acid, adipic acid, pimelic acid, cork acid, azelaic acid, brassylic acid and hexadecanedioic acid. An aromatic or alicyclic dibasic acid such as phthalic anhydride, tetrahydrophthalic anhydride and hexahydrophthalic anhydride may be used in combination with the above dibasic acid. Especially preferred as the dihydric alcohol are linear aliphatic alcohols such as ethylene glycol, diethylene glycol, triethylene glycol, 1,4-butylene glycol, 1,6-hexanediol, 1,5-pentanediol and propylene glycol. Examples of the trihydric or tetrahydric alcohols are glycerol, trimethylolethane and pentaerythritol.

Examples of suitable diisocyanate compounds as the chain extender include tolylene diisocyanate, diphenylmethane diisocyanate, hexamethylene diisocyanate, xylylene diisocyanate, lysine diisocyanate, trimethylhexamethylene diisocyanate, 4,4'-methylenebis(cyclohexyl isocyanate), 1,3-(isocyanatomethyl)cyclohexane, isophorone disiocyanate and trimethylhexamethylene diisocyanate.

The blocked polyisocyanate compound used as the crosslinking agent may be those obtained by addition-reaction of the above-exemplified diisocyanate compounds with blocking agents containing a hydroxyl group (active hydrogen compounds) such as methanol, phenol and catechol.

When the above resin composition is heated to a temperature above the dissociating temperature of the blocking agent for the blocked polyisocyanate, usually a temperature at least about 100° C. higher than the dissociating temperature, the blocking agent is dissociated to regenerate the diisocyanate compound which crosslinks with the urethane-modified polyester resins to cure the compositions. The elongation and the stress at break of the resulting cured coated film can be adjusted by properly selecting the composition and chain length of the polyester resins, the hydroxyl value and the amount of the blocked polyisocyanate mixed, etc.

In place of the urethane-modified polyester, high-molecular-weight polyesters having a number average molecular weight of about 15,000 to 500,000 and a hydroxyl value of about 20 to about 100, preferably 40 to 80, obtained by reacting mainly dibs dibasic acids and dihydric alcohols may be used.

Preferably, but not essentially, these vehicle resins have an elongation at break of at least 150% and a stress at break of at least 20 kg/cm². It is essential however that a coated film formed from the barrier coating composition has the aforesaid elongation and stress values. If the vehicle resin used does not have the above physical properties by itself, a barrier coated film having an elongation at break of at least 150% and a stress at break of at least 20 kg/cm² may be obtained by using a modifier for imparting such properties in combination with the vehicle resin. It is also possible to use the modifier in combination when the vehicle resin itself has the aforesaid properties but it is desired to adjust the elongation and stress values of the barrier coat formed from the coating composition. A thickener is an example of the modifier. Thickeners having good compatibility with the vehicle resins can be used in the process of this invention. Examples include rosin, rosin esters, hydrogenated rosin, polyterpene resins, ester gums, epoxy-modified polybutadiene, aliphatic epoxy resins having a low molecular weight, aliphatic bis-phenol-type epoxy resins having a low molecular molecular weight, polyoxytetramethylene glycol, silicone rubbers, polyvinyl ethyl ether and polyvinyl methyl ether. The amount of the thickener used differs depending upon its type, the type of the vehicle resin used, the required physical properties of the coated film, etc., and cannot be strictly specified. Generally, it is not more than 50 parts by weight, preferably 5 to 30 parts by weight, per 100 parts by weight of the vehicle resin.

The coated film formed from the barrier coating composition according to the present invention has an elongation at break of at least 150%, preferably 180 to 1500%, more preferably 200 to 850%, and a stress at break of at least 20 kg/cm², preferably 30 to 700 kg/cm², more preferably 40 to 500 kg/cm².

If the elongation is less than 150%, the barrier coat cannot fully absorb the energy of impact at the time of chipping. On the other hand, if the stress at break is less than 20 kg/cm², the barrier coat undergoes damage by the impact of pebbles at the time of chipping, and the electrocoated film is liable to peel by the impact "Elongation at break" and "stress at break", used in the present specification and the appended claims are measured by the following methods.

Test sample

A barrier coat was applied to a tin plate so that the final film thickness became 60μ. Baking was conducted for 30 min. at 120° C., after which the coating film was isolated using an amalgam process. This film isolated was used as a test sample.

Measurement methods

For the above test sample, elongation at break and stress at break were measured at +20° C. using a universal tensile tester with a constant temperature bath (Autograph S-D type manufactured by Shimadzu Corp.). In this measurement, the sample length was 20 mm and the tensile speed was 20 mm/min.

The vehicle resin and if necessary, the thickener are selected so as to give a barrier coat film having desired physical properties as mentioned previously.

The barrier coat composed mainly of a vehicle resin can be prepared in the form of an organic solvent type paint or aqueous type paint. Such a barrier coat of organic solvent type can be prepared by dissolving or dispersing a vehicle resin and if necessary a thickener in an organic solvent. There is no particular restriction on the organic solvent used, and any organic solvents generally known to be used for coating may be used. Examples include aromatic hydrocarbons such as benzene, toluene, xylene and the like; aliphatic hydrocarbons such as hexane, heptane, octane, decane and the like; chlorinated hydrocarbons such as trichloroethylene, perchloroethylene, dichloroethylene, dichloroethane, dichlorobenzene and the like.

An aqueous barrier coating composition can be prepared by dispersing a vehicle resin as mentioned above in an aqueous medium by (1) neutralizing the resin with an acid or a base when the resin has a functional group which can be neutralized with an acid or a base or (2) using an appropriate dispersant such as an emulsifier, a surfactant or the like.

In order for the aqueous barrier coat to provide a coating film of good appearance, it is possible to add to the aqueous barrier coat an organic solvent having excellent compatibility with or excellent solubility for the vehicle resin contained in the aqueous barrier coat. As such an organic solvent, there can be mentioned, for example, aromatic hydrocarbons such as benzene, toluene, xylene and the like; aliphatic hydrocarbons such as hexane, heptane, octane, decane and the like; chlorinated hydrocarbons such as trichloroethylene, perchloroethylene, dichloroethylene, dichloroethane, dichlorobenzene and the like; keton type solvents such as methyl ethyl ketone, diacetoalcohol and the like; alcohol type solvents such as ethanol, propanol, butanol and the like; and cellosolve type solvents such as methyl cellosolve, butyl cellosolve, cellosolve acetate and the like.

When a top coating paint in the form of a powder is directly applied to the barrier coat film (an intermediate coating paint is not applied), the barrier coat preferably contains another organic solvent having a boiling point of 150° C. or higher and being compatible with a top coating paint powder (hereinafter this organic solvent is referred at times to as "compatible solvent"), such as diisopropylbenzene, tetralin, decalin, o-dichlorobenzene, trichlorobenzene, benzyl alcohol, diisobutyl ketone, isophorone, cellosolve acetate, carbitol acetate, dimethyl phthalate or the like. Use of such a compatible solvent is preferable for the following reason. When a barrier coat obtained by dissolving or dispersing a vehicle resin in a mixed solvent consisting of an organic solvent or water and a compatible solvent is applied and subsequently a top coating paint powder is applied to the still wet (not baked) barrier coat film and baked, the compatible solvent remaining in the barrier coat film evaporates and reaches the top coating powder film, whereby the resin powder has improved melt-flow characteristics and the smoothness of finished coating surface is remarkably improved. The amount of the compatible solvent in the mixed solvent is not particularly restricted but is preferably 5 to 50% by weight. The content of the mixed solvent in the barrier coat is appropriately 15 to 95% by weight. Thus, when the top coating paint powder is directly applied to the barrier coat film without application of an intermediate coating paint, a finished coated surface having improved smoothness can be effectively formed by applying the top coating paint powder to the barrier coat film while it is still wet and contains the compatible solvent.

Into the barrier coat can be incorporated various additives if necessary. For example, there can be incorporated pigments mentioned with respect to the electrocoating paint, such as color pigments, extender pigments, corrosion-preventive pigments and the like. The amount of pigment incorporated can be generally 150 parts by weight or less, preferably 100 parts by weight or less, per 100 parts by weight of vehicle resin.

Particularly, blending of a corrosion-inhibiting pigment with the barrier coat is effective for markedly improving the corrosion resistance of the final coated film formed by the present invention.

The corrosion-inhibiting pigment which can be incorporated into the barrier coa has the function of inhibiting or preventing corrosion of metals, and is clearly distinguished from coloring pigments for simply imparting color and extender pigments for adjusting the physical properties of the coating film. Examples of such corrosion-inhibiting pigment are lead-type pigments, chromate-type pigments, metallic powder pigments. The type of the corrosion-inhibiting pigment to be incorporated in the barrier coat is not particularly limited. Suitably, it has such a composition that, upon contact with water, its corrosion-inhibiting components are dissolved. Particularly preferred corrosion-inhibiting pigments are those of which extracts with water show an electrical conductivity of at least 100 $\mu v/cm$, particularly at least 300 $\mu v/cm$.

The electrical conductivity of an extract of the corrosion-inhibiting pigment with water is measured as follows: 80 parts by weight of deionized water having an electrical conductivity of not higher than 1 $\mu v/cm$ and 20 parts by weight of the corrosion-inhibiting pigment are mixed and allowed to stand for 5 days at 30° C. (During this time, the mixture is mixed for 10 minutes per day). Then the supernatant liquid (aqueous extract) is separated and its electroconductivity is measured.

Examples of corrosion-inhibiting pigments having an electrical conductivity within the above-specified range include zinc chromate (1570 $\mu v/cm$), strontium chromate (973 $\mu vcm$), barium chromate (736 $\mu v/cm$), calcium chromate (8000 $\mu v/cm$), basic lead chromate (111 $\mu v/cm$), basic lead sulfate (118 $\mu v/cm$), calcium phosphate (332 $\mu v/cm$), zinc molybdate (333 $\mu v/cm$), calcium molybdate (256 $\mu v/cm$), aluminum phosphomolybdate (182 $\mu v/cm$), barium metaborate (1540 $\mu v/cm$), ammonium metavanadate (7450 $\mu v/cm$) and the like. (The numerical values in the parentheses indicate electrical conductivities.) More than one of those can be used concurrently. Of those, particularly preferred are zinc chromate, strontium chromate, barium chromate and calcium chromate. The suitable amount of the corrosion-inhibiting pigment is 0–150 parts by weight, preferably 2–50 parts by weight, per 100 parts by weight of the vehicle resin.

Such advance blending of corrosion-inhibiting pigment with the barrier coat can markedly improve the corrosion resistance of the coating system, as compared with the case wherein the pigment is blended with the electrocoating paint.

In order for the corrosion-preventive pigment contained in the barrier coat to fully exhibit its corrosion resistance, it is preferred to adjust the water absorption of the electrocoated film to 0.3 to 20% by weight particularly 0.5 to 5% by weight.

The "water absorption" of the electrocoated film is determined as follows. An electrocoated paint is applied onto a substrate to a cured film thickness of 20$\mu$ (applied area: 5×5 cm) and baked under the conditions suitable for the components therein. The resulting coated film is isolated and immersed in warm water at 50° C. for 48 hours. Its weight immediately after withdrawal from the water and that after drying it at 105° C. for 1 hour are measured. The two weights obtained are inserted into the following equation.

Water absorption of coated film =

$$\frac{\text{film weight immediately after withdrawal from warm water} - \text{film weight after drying}}{\text{film weight after drying}} \times 100$$

Adjustment of the water absorption of the electrocoated film as above presumably facilitates the penetration of the water-extracted component of the corrosion-resistant pigment from the barrier coat containing the pigment into the electrocoated film, to fully exhibit its cathode- (or anode-) inhibiting effect on the surface of steel member and to protect the steel member. The adjustment of water absorption can be easily effected by controlling the crosslinking density of the coating film, introduction of hydrophilic groups into the vehicle resin and the amount of blending extender pigment, or the like.

The adjustment of water absorption as mentioned above makes it unnecessary to add a corrosion-preventive pigment to the electrocoating paint. As a result, the electrocoating paint can have improved storage stability, film smoothness, etc.

Into the barrier coat can further be incorporated, for purposes of, for example, (1) improvement of physical properties of coated film, (2) improvement of dispersibility of pigments and (3) filling, etc., proper amounts of known additives for coatings such as, for example, rosin, rosin esters, hydrogenated rosin, polyterpene resins, ester gums, epoxy-modified polybutadienes, aliphatic epoxy resins of low molecular weight, aliphatic bisphenol type epoxy resins of low molecular weight, polyoxytetramethylene glycol, silicone rubbers, polyvinyl ethyl ether, polyvinyl methyl ether, a plasticizer (e.g. dioctyl phthalate, tricresyl phosphate), an antisagging agent (e.g. aluminum stearate, silica gel), a pigment dispersing agent, a film surface improver and the like.

When an intermediate coating paint is omitted and a top coating paint is directly applied on the barrier coat film, it is preferable that the barrier coat further contains deterioration inhibitors for resins such as an ultraviolet absorber, a photostabilizer, an anti-oxidant and the like. The purpose of using such inhibitors is to absorb an ultraviolet rays pasing through a top coating film having a small hiding power and to prevent the oxidation of radicals generated in resin chains and thereby to protect the barrier coat film and even the electrocoating film surface from being deteriorated with time by the ultraviolet ray.

The ultraviolet absorber usable in the barrier coat can be any as long as it can absorb the energy of ultraviolet ray, is compatible with or uniformly dispersible in the vehicle resin used in the barrier coat and does not easily decompose and lose its function at a temperature at which the barrier coat film or a whole coating system is baked. The usable ultraviolet absorber includes, for example, benzophenones such as benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4-methoxybenzophenone, 2-hydroxy-4-octoxybenzophenone, 2-hydroxy-4-dodecyloxybenzophenone, 2-hydroxy-4-methoxy-5-sulfobenzophenone, 5-chloro-2-hydroxybenzophenone, 2,2'-dihydroxy-4,4'-dimethoxy-5-sulfobenzophenone, 2-hydroxy-4-methoxy-2'-carboxybenzophenone, 2-hydroxy-4-(2-hydroxy-3-methylacryloxy)propoxybenzophenone and the like; benzotriazoles such as 2-(2'-hydroxy-5'-methylphenyl)benzotriazole, 2-(2-hydroxy-3,5-di(1,1-dimethylbenzylphenyl)-2H-benzotriazole, 2-(2'-hydroxy-3',5'-ditertiary-butylphenyl)benzotriazole, 2-(2'-hydroxy-3'-tertiary-butyl-5'-methylphenyl)benzotriazole, 2-(3,5-ditertiary-amyl-2-hydroxyphenyl) benzotraizole, 2-(2'-hydroxy-3',5'-ditertiary-butylphenyl)-5-chlorobenzotriazole, 2-(2'-hydroxy-3,',5'-ditertiary-isoamylphenyl) benzotriazole, 2-(hydroxy-5-tertiary-butylphenyl)benzotriazole and the like; salicylic acid esters such as phenyl salicylate, 4-tertiary-butylphenyl salicylate, p-octylphenyl salicylate and the like; diphenyl acrylates such as ethyl-2-cyano-3,3'-diphenyl acrylate, 2-ethylhexyl-2-cyano-3,3'-diphenyl acrylate and the like; hydroxy-5-methoxyacetophenone; 2-hydroxynaphthophenone; 2-ethoxyethyl-p-methoxycinnamate; nickel bisoctylphenylsulfide; 2,2'-thiobis(4-t-octylphenolate)-n-butylamine-nickel; oxalic acid anilide; etc. There are commercially available ultraviolet absorbers. As commercial products of benzotriazole type, there are mentioned, for example, Tinuvin 900 and Tinuvin 328, both of CIBA-Geigy Co. As products of benzophenone type, there is mentioned, for exasmple, Unimul 400 (a product of BASF). As products of oxalic acid anilide type, there is mentioned, for example, Sanduvor 3206 of SANDOZ Ltd.

The amount of ultraviolet absorber used is preferably 0.1 to 10 parts by weight, more preferably 0.5 to 5 parts by weight, per 100 parts by weight of vehicle resin.

As the photostabilizer, there are mentioned, for example, tetrakis(2,2,6,6-tetramethyl-4-piperidyl) 1,2,3,4-butanetetracarboxylate, 8-acetyl-3-dodecyl-7,7,9,9-tetramethyl-1,3,8-triazaspiro(4,5)decane-2,4-dione, bis(1,2,2,6,6-entamethyl-4-piperidinyl) sebacate, bis(2,2,6,6-tetramethyl-4-piperidyl)sebacate, bis(1,2,2,6,6-pentamethyl-4-piperidyl) sebacate, dimethyl-2-(4-hydroxy-2,2,6,6-tetramethyl-1-piperidyl) ethanol condensate, poly[6-(1,1,3,3-tetramethylbutyl)imino-1,3,5-triazine-2,4-diyl-4-(2,2,6,6-tetramethylpiperidyl)-hexamethylene-4,4-(2,2,6,6-tetramethylpiperidyl-)imino], 1-[2,3-(3,5-di-t-butyl-4-hydroxyphenyl)propionyloxyethyl)-3,4-(3,5-di-t-butyl-4-hydroxyphenyl)-propionyloxy]-2,2,6,6-methyltetra piperidine, etc. As the anti-oxidant, there are mentioned, for example, 4,4'-thiobis-(3-methyl-6-t-butylphenyl), 2,2'-methylenebis-(4-methyl-6-t-butylphenol), 4,4'-methylenebis-(2,6-di-t-butylphenol), 1,3,5-trimethyl-2,4,6-tris(3,5-di-t-butyl-4-hydroxybenzyl)benzene, tris(2-methyl-4-hydroxy-5-t-butylphenyl)butane, pentaerythritol tetrakis(3-laurylthiopropionate), dilaurylthio dipropionate, distearylthio dipropionate, dimyristylthio dipropionate, triethylene glycol bis-3-(3-t-butyl-5-methyl-4-hydroxyphenyl)propionate, 1,6-hexanediol bis-3-(3,5-di-t-butyl-4-hydroxyphenyl)propionate, 2,4-bis(n-octylthio)-6-(4-hydroxy-3,5-di-t-butylanilino)-1,3,5-triazine, pentaerythritol tetrakis-[3-(3,5-di-t-butyl-4-hydroxy-phenyl)-propionate], 2,2-thiodiethylene-bis[3-(3,5-di-t-butyl-4-hydroxyphenyl)-propionate], octadecyl-3-(3,5-di-t-butyl-4-hydroxyphenyl)-propionate, 2,2-thiobis(4-methyl- 6-t-butylphenol), N,N'-hexamethylenebis-(3,5-di-t-butyl-4-hydroxy-hydroxycinnamamide), etc. The photostabilizer and/or the anti-oxidant is used preferably in combination with the ultraviolet absorber. The appropriate amount of photostabilizer used is 0.1 to 10 parts by weight, preferably 0.5 to 3 parts by weight, based on 100 parts by weight of resin. The appropriate amount of anti-oxidant used is 0.1 to 5 parts by weight, preferably 0.2 to 3 parts by weight on the same basis.

As one important requirement, the barrier coat film must have excellent adhesion to the electrocoating film and the intermediate or top coating film which will be explained later. Desirably, the adhesion to each of said films is at least 25 kg/cm². The adhesion is, by definition, a measurement by a tensile tester of an energy (kg/cm²) required to peel an attachment bonded to the barrier coat film on the electrocoating film or to the intermediate or top coating film on the barrier coat film. The adhesivity is measured by applying and curing each paint under predetermined conditions, bonding an attachment having a circular contact area of 5 mm in diameter to the resulting barrier coat film, intermediate coating film or top coating film using a two-pack epoxy resin adhesive, peeling the attachment from the film in a vertical direction at 20° C. at a tensile speed of 50 mm/min using a Schopper tensile tester manufactured by Ueshima Seisakusho and measuring a force (kg/cm²) required for the peeling.

The adjustment of the above mentioned adhesion of the barrier coat film can be effected mainly by the selection of the type, amount, etc. of the vehicle resin contained in the barrier coat. It can also be effected by, for example, the addition of the above mentioned modifier or pigments.

In the present invention, the barrier coat can be applied either after the electrocoated film has been cured with heating or before said film is cured.

The application of the barrier coat on the electrocoated film already formed according to the method mentioned above can be conducted according to any known method such as spray coating, brush coating, dip coating, melt coating, electrostatic coating or the like. The film thickness of the barrier coat is preferred to be ordinarily 1 to 20 μ, particularly 5 to 10 μ in terms of thickness of dried film.

As mentioned previously, in the present invention process, on the surface of the barrier coat film formed is then coated an intermediate coating paint or a top coating paint. Prior to this coating, the barrier coat film can be baked. The prior baking is generally preferable but is not essential. Depending upon the type of paint to be applied on the barrier coat film, for example, when a top coating paint powder is directly applied on the barrier coat film, baking of the barrier coat film is not required and wet-on-wet application of an intermediate coating paint or a top coating paint is possible. There are cases that this wet-on-wet application is preferable.

The appropriate baking temperature is genrally 80° to 180° C., particularly 80° to 140° C.

Intermediate coating paint

Onto the surface of the barrier coat film can optionally be applied an intermediate coating paint, prior to the application of a top coating paint. The main purpose of conducting this intermediate coating is to allow a final coated film to have high quality represente by excellent durability, surface smoothness and distinctness of image gloss, adhesion, etc.

As the intermediate coating paint optionally usable in the present invention process, there can be used any known intermediate coating paint which has been used in conventional coating systems consisting of a primer, an intermediate coating paint and a top coating paint and is excellent in adhesion, distinctness of image gloss (surface smoothness), surface sharpness, overbaking resistance, weather resistance. etc. Specifically, there can be mentioned thermosetting intermediate coating paints using, as a vehicle main component, a combination of (1) a short or ultra-short oil alkyd resin having an oil length of 30% or less and/or an oil-free polyester resin and (2) an amino resin. The alkyd resin and and the polyester resin desirably have a hydroxyl value ordinarily of 6% to 140, particularly 8% to 12% and an acid value of 5 to 100.

As the particularly preferable alkyd resins and polyester resins, there can be mentioned resins obtained from esterification between a polyhydric alcohol (e.g. ethylene glycol, propylene glycol, butylene glycol, hexanediol, neopentyl glycol, glycerine, trimethylolethane, trimethylolpropane, pentaerythirotol) and a polybasic acid (e.g. phthalic acid, maleic acid, terephthalic acid, adipic acid, tetrahydroxyphthalic acid, fumaric acid, itaconic acid, pyromellitic acid, their anhydrides).

As the oil usable for modification of the alkyd resin, there can be mentioned, for example, drying oils or semi-drying oils such as linseed oil, soybean oil, safflower oil, tung oil, tall oil, dehydrated castor oil and the like, as well as unsaturated fatty acids obtained from said oils.

As the amino resin used in combination with the oil-modified alkyd resin or the oil-free polyester resin, generally there are suitably used melamine resins etherified with an alkyl group of 1 to 5 carbon atoms, urea resins, benzoguanamine resins, etc. With respect to the amount ratio of the amino resin to other resins, it is desirable that the oil-modified alkyd resin and/or the oil-free polyester resin is 65 to 85% preferably 70 to 80% in terms of solid weight and the amino resin is 35 to 15%, preferably 30 to 20%. At least part of the amino resin can be replaced by a polyisocyanate compound or a blocked polyisocyanate. As the blocked or non-blocked polyisocyanate compound, there can be mentioned, for example, tolylene diisocyanate, diphenyl methane diisocyanate, xylylene diisocyanate, hexamethylene diisocyanate, isophorone diisocyanate, a reaction product between 1 mole of trimethylolpropane and 3 moles of tolylene diisocyanate or hexamethylene diisocyanate.

The intermediate coating paint using the above resins as vehicle components is preferably in the form of an organic solvent type or aqueous type (aqueous solution or aqueous dispersion). The organic solvent type is most preferable. The intermediate coating paint may also have a form of non-aqueous dispersion type, high solid type, powder type or the like. It is preferable that the intermediate coating paint give a coating film having a pencil hardness generally of 3B to 6H, preferably B to 2H at 20° C. More preferably, the intermediate coat has the elongation at break and stress at break described with respect to the top coat. The intermediate coating paint can further contain, if necessary, extender pigments, color pigments and other additives ordinarily used for coatings, in amounts ordinarily used.

The application of the intermediate coating paint on the barrier coat film can be conducted, as in the application of the barrier coat, using a method such as spray coating, brush coating, dip coating, melt coating, electrostatic coating or the like. It is preferable that the intermediate coating film have a thickness generally of 10 to 100 μ preferably 15 to 50μ. The curing of the intermediate coating film can be conducted at any temperature suitable for the curing characteristic of the film as long as the temperature causes no substantial thermal deterioration of the film. However, when thermal curing is applied, the curing temperature is preferably 80° to 170° C., more preferably 120° to 150° C.

Top coating paint

This is a paint to be applied on the surface of the barrier coat film or of the intermediate coating film in order to give the coated bodies pleasant appearance. As this top coating paint, there can be used top coating paints used in conventional coating systems consisting of a primer, an intermediate coating paint and a top coating paint. As such top coating paint, there can generally be used conventionally known paints capable of forming a coating film excellent in surface appearance (e.g. sharpness, smoothness, gloss), weather resistance (e.g. gloss retention, color retention, chalking resistance), chemical resistance, moisture resistance, water-resistance, curability, etc. As the top coating paint usable in the present invention process, there can be mentioned, for example, crosslinking curable paints preferably of organic solvent type, high solid type, nonaqueous dispersion type, aqueous type or powder type, using as the main vehicle component.

As the top coating paint capable of forming such a tough and hard film, there can be mentined, for example, crosslinking-curable paints using, as a vehicle component, a resin such as an amino-acryl resin type, an amino-alkyd resin type, an amino-polyester resin type, an amino-fluorine resin type, an amino-silicone-polyester resin type, an unsaturated polyester resin type, an isocyanate-acryl resin-type, an isocyanate-polyester resin type, an isocyanate-fluorine resin type, an unsaturated acryl resin type or the like. Preferable of these are top coating paints of amino-alkyd resin type, aminoacryl resin type, and amino-silicon-polyester resin type.

Preferable examples of the top coating paint include an amino acryl resin type paint, namely, a thermosetting paint using an amino resin as a crosslinking agent. This paint uses, as main components, (a) an acrylic resin obtained by polymerizing an appropriate combination of a hard monomer (e.g. methyl methacrylate, ethyl methacrylate, n-butyl methacrylate, isobutyl methacrylate), a soft monomer (e.g. n-hexyl methacrylate, lauryl methacrylate, methyl acrylate, ethyl acrylate, n-butyl acrylate, 2-ethylhexyl acrylate), a functional group-containing monomer (e.g. acrylic acid, methacrylic acid, hydroxyethyl methacrylate, hydroxyethyl acrylate, acrylamide, glycidyl acrylate) and other monomer (e.g. styrene, acrylonitrile) and (b) an amino resin selected from resins such as a melamine resin etherified with an alkyl group of 1 to 5 carbon atoms and an urea resin etherified with an alkyl group of 1 to 5 carbon atoms. Said acrylic resin (a) preferably has a number average molecular weight of 5,000 to 50,000, a hydroxyl value of 5 to 40 and an acid value of 2 to 100. Another preferable example of the top coating paint is an amino-alkyd resin type paint.

When the top coating paint is capable of forming a tough hard film having an elongation at break of not more than 40%, preferably 5 to 30%, more preferably 5 to 20%, and a stress at break of at least 300 kg/cm$^2$, preferably 350 to 1,000 kg/cm$^2$, more preferably 450 to 900 kg/cm$^2$, cracking and scratches hardly occur on the surface of the resulting composite coated film and no exposure of the surface of the metallic substrate occurs at the time of collision of rock salt particles and the like with the coated surface. The energy of collision is dispersed in the tough and hard top coat portion, and therefore, is low per unit area of the coated film. At the same time, the energy of collision is absorbed by the barrier coat having a high elongation and excellent flexibility in the intermediate layer. Hence, the coated film composite coated film does not peel upon collision of such materials.

Accordingly, in the present invention, a thermosetting paint capable of forming a coated film having an elongation at break and stress at break within the above ranges is most suitable as the top coating paint.

If the elongation of the coated film is larger than 40%, the coated film has insufficient solvent resistance and hardness for automotive outer panels. If the stress at break is lower than 300 kg/cm$^2$, a sufficient improvement in chipping resistance cannot be expected.

As the method for forming a tough and hard film, there can be mentioned, for example, (1) when the vehicle component is a polyester resin- or an alkyd resin-based, a method wherein the polybasic acid component of said resin is a hard, aromatic type polybasic acid such as phthalic acid, isophthalic acid, terephthalic acid, trimellitic acid, their anhydrides or the like, (2) when the vehicle component is an acryl resin-based, a method wherein said resin is a hard, acrylic type resin using a monomer giving a high glass transition temperature and (3) a method wherein the vehicle component is a resin having a relatively large molecular weight and containing within the molecule a large proportion of crosslinkable functional groups and the amount and type of catalyst (internal or external catalyst) and/or the amount and type of crosslinking agent (or curing agent), namely physical properties such as elongation and stress are controlled.

The properties of the coated film formed by the top coating paint can be accurately determined by actually forming a sample of a coated film from the top coating paint and measuring the elongation and stress a break of the resulting coated film. This enables selection of paints suitable for the proces of this invention.

The form of the top coating paint used in the process of this invention is not particularly restricted, and can be of the organic solution type, non-aqueous dispersion type, aqueous solution type, aqueous dispersion-type, powder type, high solid type, etc.

The top coat finishing may be carried out by, for example, the following methods.

(1) A one-coat-one bake method in which a solid color top coating paint containing a colored pigment or a metallic top coating paint containing a metallic pigment is coated on the surface of the barrier coat or the intermediate coat and then cured by heating.

(2) A solid color or metallic finishing method by the two-coat two-bake process or the two-coat one-bake process in which the solid color or metalic paint used in (1) above is coated on the surface of the barrier coat or the intermediate coat, and with or without curing under heat, a clear top coating paint containing little or no colored pigment is coated and baked.

The top coating paints mentioned above are applied preferably by spray coating, electrostatic coating, etc. The resulting coated film is dried and/or cured by room temperature drying, heat drying, heat curing, crosslinking curing by irradiation of active energy rays (e.g. electron rays, ultraviolet rays), etc., depending upon the form, type, etc. of paint applied.

According to method (1), the solid color or metallic to coating paint is applied to the barrier coat after baking or without baking. The film thickness is not particularly limited. However, the suitable film thickness is about 25 to 50 micrometers for liquid paints, and about 30 to about 150 micrometers, preferably 40 to 100 micrometers, more preferably 45 to 90 micrometers (thickness after baking). Conveniently, the baking is carried out at a temperature of 120° to 210° C., especially 130° to 180° C. When a compatible solvent is included in the barrier coat and a powder paint is applied to the barrier coat, the flowability of the top coat powder paint film is increased by the presence of the compatible solvent, and the occurrence of minute depressions and raisings (such as orange peel) can be prevented and the coated surface can be finished into a smooth surface.

Preferably, method (2) is carried out as follows. The solid color or metallic top coating paint is applied to a film thickness of 10 to 150 microns with or without baking the barrier coat or the intermediate coat. Then, with or without baking (the baking temperature is 80° to 170° C.), the above clear paint is applied to a film thickness of 20 to 150 micrometers. Then, the coated film is baked at a temperature of 120° to 210° C. The total thickness of the solid color or metalic coated film and the clear coated film may be at least 20 micrometers, preferably 40 to 200 micrometers, more preferably 50 to 200 micrometers.

The coated film formed as above by the process of this invention has excellent surface appearance and weather resistance and markedly improved chipping resistance, corrosion resistance and interlayer adhesion and other physical properties. Accordingly, it is particularly suitable for use in automotive bodies.

The following Examples and Comparative Examples are given to illustrate the invention more specifically.

I. SAMPLES (1) Metallic substrate

A steel panel (having a size of 300×90×0.8 mm) having a flat portion and an acute-angled (90°) portion and chemically treated with Bondelite #3030 (a zinc phosphate-type metal surface treating agent made by Nihon Parkerizing Co., Ltd.).

(2) Electrocoating paints (A) A cationic electrocoating paint containing a polyamide-modified bisphenol-type resin (acetic acid used as a neutralizing agent) and a blocked polyisocyanate compound (pH 6.5; solids content 20%; water absorption of a coated film therefrom 2.1%) as vehicle components.

(B) A cationic electrocoating paint comprising 100 parts of the vehicle components of paint (A) above and 61.5 parts of a pigment composed of a mixture of titanium dioxide, carbon black and clay in a weight ratio of 30:1.5:30 (pH 6.5; solids content 20%; water absorption of a coated film therefrom 3.6%). The coated film from this paint by itself showed insufficient surface smoothness.

(C) An anionic electrocoating paint composed of 100 parts of a paint containing maleinized polybutadiene (monoethanolamine used as a neutralizing agent) and alkoxymethylmelamine compound and 75 parts of the pigments used in (B) (pH 8.1; solids content 20%; water absorption of a coated film therefrom 3.5%).

(3) Barrier coats (A) A paint composed of 100 parts by weight of a mixture of HYCAR CTBN 1300×13 (a carboxyl-containing butadiene/acrylonitrile copolymer made by Ube Industries, Ltd.) and Epikote 828 (an epoxy resin made by Shell Chemical Co.) and 15 parts by weight of calcium chromate (a 70:30 by weight mixture of toluene and dimethyl phthalate was used as a solvent). (A coated film prepared from it has a stress at break of 45 kg/cm$^2$ and an elongation of 350%.)

(B) Thermosetting polyester resin composition

A composition prepared by adding phenol-blocked hexamethylene diisocyanate to a urethane-modified polyester resin (hydroxyl value about 80; molecular weight about 6,000) obtained by reacting a low-molecular-weight polyester (molecular weight about 800) derived from adipic acid, 1.6-hexanediol and trimethylolpropane) with hexamethylene diisocyanate, and mixing 100 parts by weight of the resulting polyester composition with 15 parts by weight of zinc chromate (toluene was used as a solvent). (A coated film prepared from the resulting composition has a stress at break of about 250 kg/cm$^2$ and an elongation of about 250%.)

(C) Same as (A) above except that 15 parts of calcium chromate was not added.

(D) A mixture composed of 500 parts of (high-molecular-weight linear polyester made by Toyobo Ltd.) as a 20% solution in methyl ethyl ketone/toluene (2/8), 168 parts of Coronate L (75% solution, made by Nippon Polyurethane Co., Ltd.) and 20 parts of strontium chromate. (A coated film prepared from it has a stress at break of 70 kg/cm$^2$ and an elongation of 500%.)

(E) A mixture composed of 100 parts of Olester NL2448 (prepolymer crosslinked-type urethane resin made by Mitsui Toatsu Chemicals, Inc. having an OH value of 10 as a 40% solution in toluene and ethyl acetate), 25 parts of Takenate B-830 made by Takeda Chemical Co., Ltd.; NCO content 7.0%; as a 55% solution in ethyl acetate and methyl isobutyl ketone and 12 parts of barium chromate. (A coated film prepared from it has a stress at break of 55 kg/cm$^2$ and an elongation of 350%.)

(F) Thermosetting polyester resin composition (comparison)

A composition composed of a short-oil polyester resin (oil length 20%; hydroxyl value 80; acid value 10) and butanol-modified methylated melamine resin (using toluene/benzyl alcohol=70/30 as an organic solvent). (A coated film prepared from it has a stress at break of 100 kg/cm$^2$ and an elongation of 100%.)

(G) Thermosetting polyester resin (comparison)

A composition composed of a short-oil polyester resin (oil length 20; hydroxyl value 120; acid value 15) and butanol-modified melamine resin (using toluene as a solvent). (A coated film prepared from it has a stress at break of 15 kg/cm$^2$ and an elongation of 250%.)

(4) Intermediate coating paint

Amilac N-2 Sealer (an intermediate coating paint of the amino polyester resin type manufactured by Kansai Paint Co., Ltd.) (A coated film prepared from it has a pencil hardness at 20° C. of H.)

(5) Top coating paints (A) A powdery top coating paint for solid color

A powder paint prepared by mixing 100 parts of an acrylic copolymer (number average molecular weight about 25,000) derived from 30% by weight of glycidyl methacrylate, 30 parts by weight of methyl methacrylate, 20 parts by weight of butyl acrylate and 20 parts by weight of styrene, with 25 parts by weight of dodecanedioic acid, 30 parts of titanium white pigment and 1 part by weight of a coated surface adjusting agent. (A coated film prepared from it has a stress at break of 700 kg/cm$^2$ and an elongation of 8%.)

(B) Clear paint of the acrylic resin/organic solvent-type

An organic solvent-based clear paint composed of 70% by weight of a copolymer derived mainly from ethyl methacrylate, isobutyl methacrylate, styrene and hydroxyethyl acrylate (number average molecular weight about 15,000; hydroxyl value 100) and 30% by weight of butylated melamine resin. (A coated film prepared from it has a stress at break of 450 kg/cm² and an elongation of 8%.)

(C) Acrylic resin-type organic solvent-based metallic paint

An organic solvent-based metallic paint prepared by mixing a vehicle component consisting of 75% of a copolymer (number average molecular weight about 30,000; hydroxyl value 100) derived from methyl methacrylate, ethyl methacrylate, n-butyl methacrylate and hydroxyethyl methacrylate and 20% by weight of butylated melamine resin with a aluminum powder paste (a mixture of toluene/Carbitol acetate=70/30 by weight was used as an organic solvent). (A coated film prepared from it has a stress at break of 500 kg/cm² and an elongation of 5%.)

II. EXAMPLES AND COMPARATIVE EXAMPLES

The above samples of electrocoating paints, barrier coats, intermediate coating paint and top coating paints were applied to the metallic substrate by the procedures shown in Table 1.

The electrodeposition conditions in Table 1 were as follows:

Cation electrodeposition conditions

Solids content of the bath: 20% by weight
Bath temperature: 28° C.
Bath pH: 6.5
Voltage applied: about 250 V
Period of passing electric current: about 180 seconds The electrodeposited film was washed with water and then baked at 170° C. for 30 minutes. The film thickness refers to the thickness of the cured film.

Anion electrodeposition conditions

Solids content of the bath: 20% by weight
Bath temperature: 28° C.
Bath pH: 8.1
Voltage applied: 200 V
Period of passing electric current: 180 seconds The electrodeposited film was washed with water and then baked at 170° C. for 30 minutes.

The barrier coats were applied by an air-sprayer. All film thicknesses were 6 to 10 micrometers after drying at flat portions. Baking was carried out at 120° C. for 30 minutes.

The intermediate coating paints and the top coating paints were spray-coated by electrostatic coating equipment. Baking was carried out at 140° C. for 30 minutes. The thickness of the intermediate coating was 20 micrometers.

In the top coating, "1C1B" refers to a coating system in which a solid color paint is applied and then baked at 160° C. for 30 min (cured film thickness 50 microns). "2C1B" refers to a coating system wherein a metallic paint (C) and a clear paint (B) are applied in this order or a wet-on-wet basis and then the resulting two films are simultaneously baked at 160° C. for 30 min. All film thicknesses are for flat portions. Film thickness was 15 microns for (C) and 30 microns for (B).

III. RESULTS OF PERFORMANCE TESTS

The coated panels obtained in the above Examples and Comparative Examples were used as test panels and subjected to performance tests. The results are shown in Table 2 which appears later.

[Test items and test methods]

1. Chipping resistance[*1]

(1) Gravel impact testing machine: Q-G-R Gravelometer manufactured by Q Panel Co.
(2) Stones to be blown: Crushed stones having diameters of about 15 to 20 mm.
(3) Volume of stones to be blown: About 500 ml.
(4) Blowing air pressure: About 3 kg/cm².
(5) Test temperature: About 20° C.

A test panel was fixed to a support panel. About 400 ml of crushed stones were allowed to hit the test panel using a blowing air pressure of about 3 kg/cm². Thereafter the test panel was tested for film surface condition and salt water spray resistance. Film surface condition was examined visually and evaluated based on the criteria given below. In the test of salt water spray resistance, a test panel after having been hit by the crushed stones was subjected to a salt water spray test by JIS Z 2371 for 840 hrs.; then, an adhesive cellophane tape was stuck on the film surface of the test panel and rapidly peeled off; and the state of subsequent rust development, condition of corrosion, peeling of coating film, etc. at the hit portions were observed.

Evaluation criteria (1) Film surface condition

⊚ : Cracking by hitting is recognizable very slightly at the limited places of a top coated film. There is no peeling of an electrocoating film.

○: Cracking by hitting is recognizable in places of a top coated film and peeling of the electrocoating film is seen at less numbers of places.

Δ: Top coating peeled off at many places and peeling of electrocoated film occured at a minor degree.

X: The greatest part of the top coating film peels off. An electrocoating film peels off at the hit portions and their surrounding areas.

(2) Salt water spray resistance

⊚ : Rust development, corrosion, film peeling, etc. are not observed.
○: Rust, corrosion and film peeling are slight.
Δ: Rust, corrosion and film peeling are a little severe.
X: Rust, corrosion and film peeling are very severe.

2. Impact resistance

This test was conducted in an atmosphere of 0° C. in accordance with JIS K 540-1979 6.133B. A weight of 500 g was dropped from a height of 50 cm to examine the damage incurred on the coating film.

⊚ : No change.
Δ: Slight appearance of cracks and peeling.
X: Severe cracks and peeling.

3. Adhesion

On the coated film of a test panel were formed 100 squares each of 1 mm×1 mm in accordance with JIS K 5400-1979 6.15. An adhesive cellophane tape was applied to it. The tape was rapidly peeled and the number of remaining squares was counted.

4. Water resistance

The test panel was immersed in water of 40° C. for 10 days and the film surface was evaluated.
  ⊚: No change.
5. Smoothness
  The coated surface was visually observed for the presence of depressions and raisings, and the result was evaluated on the following scale.
  ⊚: Little or no occurrence
  Δ: Some occurrence of depressions and raisings observed.
6. Corrosion resistance at acute-angled portion
  A test panel was subjected to the same salt water spray test as in 1. Chipping resistance for 960 hrs. The condition of film surface at the acute-angled portion was examined visually.
  ⊚: No rust development.
  Δ: Slight rusting.
  X: Severe rusting.
7. Filiform corrosion resistance
  In the coated film of a test panel two lines were cut diagonally with a cutter down to the substrate of the panel. Then the test panel was placed in a salt spray tester of JIS Z 2371 for 48 hrs, after which the film surface was washed with deionized water. Then, the test panel was placed in a constant temperature and constant humidity box (temperature: 40°±2° C. R.H.: 85±2%) for 480 hrs and the extent of filiform corrosion on the test panel was examined. The average length and densith of filiform corrosion were recorded.

Evaluation criteria

F: 2 to 3 or less filiform corrosions within each 10 mm portion of cut lines
M: around 5 to 6 filiform corrosions within each 10 mm portion of cut lines
D: 10 or more filiform corrosions within each 10 mm portion of cut lines
8. Scab corrosion resistance
  A test panel was immersed in warm water of 40° C. for 120 hrs and then dried for 4 hrs at 20° C. The resulting test panel was subjected to chipping with 300 g of No. 6 crushed stones at a pressure of 4 kg/cm² and also to straight line cutting. Then, the panel was subjected to repetition of a unit test [immersion in 5% aqueous NaCl solution at 30° C. for 2 hrs→standing at −20° C. for 1 hr→standing outdoors for 45 hrs]. This unit test was conducted 3 times per week as one cycle. After 15 cycles, the surface conditions of the film (particularly, rust, swelling, etc.) were examined.
  ⊚: No distinct change.
  Δ: Slight rust and swelling.
  X: Severe rust and swelling.
9. Salt spray resistance
  The coated film on the test panel was crosscut to the substrate surface, and tested for 1660 hours as in (1). The coated film was then evaluated on the following scale.
  ⊚: No change
  ○: Slight occurrence of rust
  X: Marked occurrence of rust and blister.

TABLE 1

|  | Example |  |  |  |  |  |  |  |  |  |  |  | Comparative Example |  |  |  |  |
|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 1 | 2 | 3 | 4 | 5 |
| Coating step |  |  |  |  |  |  |  |  |  |  |  |  |  |  |  |  |  |
| Electrocoating |  |  |  |  |  |  |  |  |  |  |  |  |  |  |  |  |  |
| Paint | A |  |  |  | B |  |  |  |  | C |  |  | A | B | C | B | C |
| Film thickness (μ) |  |  |  |  |  |  |  |  |  |  |  |  |  |  |  |  |  |
| Flat portion | 20 |  |  |  | 23 |  |  |  |  | 25 |  |  | 20 | 23 | 25 | 23 | 25 |
| Acute-angl portion | 0-1 |  |  |  | 9 |  |  |  |  | 12 |  |  | 0-1 | 9 | 12 | 9 | 12 |
| Barrier coating | A | C | A | B | C | D | E | A | B | C | D | E | — | — | — | F | G |
| Intermediate coating | — |  |  |  | — |  | ○ |  |  | — |  | ○ | — | ○ | — |  |  |
| Top coating |  |  |  |  |  |  |  |  |  |  |  |  |  |  |  |  |  |
| 1C1B |  |  |  |  |  |  | ○ |  |  |  |  | ○ |  |  | ○ |  |  |
| 2C1B |  |  | ○ |  |  |  |  |  |  |  |  |  | ○ |  |  | ○ |  |
| Properties of the coated film |  |  |  |  |  |  |  |  |  |  |  |  |  |  |  |  |  |
| Chipping resistance |  |  |  |  |  |  |  |  |  |  |  |  |  |  |  |  |  |
| Surface condition | ⊚ | ⊚ | ⊚ | ⊚ | ⊚ | ⊚ | ⊚ | ⊚ | ⊚ | ⊚ | ⊚ | ⊚ | X | X | X | Δ | Δ |
| Salt spray resistance | ⊚ | ○ | ⊚ | ⊚ | ⊚ | ⊚ | ⊚ | ⊚ | ⊚ | ○ | ⊚ | ⊚ | X | X | X | Δ | Δ |
| Impact resistance | ⊚ | ⊚ | ⊚ | ⊚ | ⊚ | ⊚ | ⊚ | ⊚ | ⊚ | ⊚ | ⊚ | ⊚ | X | X | X | Δ | Δ |
| Adhesion | 100 | 100 | 100 | 100 | 100 | 100 | 100 | 100 | 100 | 100 | 100 | 100 | 100 | 100 | 100 | 85 | 87 |
| Water resistance | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| Smoothness | ⊚ | ⊚ | ⊚ | ⊚ | ⊚ | ⊚ | ⊚ | Δ | Δ | Δ | ⊚ | ⊚ | Δ | Δ | Δ | ⊚ | ⊚ |
| Corrosion resistance at acute-angled portion | Δ | Δ | ⊚ | ⊚ | ⊚ | ⊚ | ⊚ | ⊚ | ⊚ | ⊚ | ⊚ | ⊚ | X | Δ | Δ | Δ | Δ |
| Filiform corrosion resistance | F | M | F | F | M | F | F | F | F | M | F | F | M | M | M | M | M |
| Scab corrosion resistance | ⊚ | ⊚ | ⊚ | ⊚ | ⊚ | ⊚ | ⊚ | ⊚ | ⊚ | ⊚ | ⊚ | ⊚ | X | X | X | X | X |
| Salt spray resistance | ⊚ | ○ | ⊚ | ⊚ | ○ | ⊚ | ⊚ | ⊚ | ⊚ | ○ | ⊚ | ⊚ | X | X | X | X | X |

What we claim is:
1. A process for coating a metallic substrate which comprises:
  applying an electrocoating paint to a metallic substrate, said electrocoating paint selected from the group consisting of a cationic electrocoating paint comprising as a main component a basic amino group-containing resin neutralized with an acid, the resin before neutralization having a base value of about 20 to about 200,
  then applying a barrier coating to the electrocoated surface, said barrier coating comprising a crosslinkable hardenable resin and being capable of forming a barrier coat film having an elongation at break of 180 to 1500% and a stress at break of 30 to 700 kg/cm²,
  and applying a top coating paint as the final paint coating.

2. A process according to claim 1 wherein the electrocoating paint is a thermosetting electrocoating paint of cathodic deposition type or anionic deposition type.

3. A process according to claim 1 wherein the electrocoating paint contains 35 parts by weight or less of pigments based on 100 parts by weight of resin solid.

4. A process according to claim 1 wherein the electrocoating paint contains 40 to 150 parts by weight, preferably 55 to 100 parts by weight of pigments based on 100 parts by weight of resin solid.

5. A process according to claim 1 wherein the film formed by the barrier coat has an elongation at break of 200 to 850% and a stress at break of 40 to 500 kg/cm$^2$.

6. A process according to claim 1 wherein the barrier coat is an organic solent type paint.

7. A process according to claim 1 wherein the barrier coat further compresses a corrosion-preventive pigment.

8. A process according to claim 7 wherein the corrosion-preventive pigment is that of which aqueous extract has an electroconductiviy of at least 100 $\mu v$/cm.

9. A process according to claim 7 wherein the barrier coat contains, per 100 parts by weight of the crosslinking hardenable resin, 0–150 parts by weight of the corrosion-preventive pigment.

10. A process according to claim 7 wherein the corrosion-preventive pigment is selected from the group consisting of zinc chromate, strontium chromate, barium chromate and calcium chromate.

11. A process according to claim 7 wherein the film formed by the barrier coat is 1 to 20$\mu$ in terms of thickness of dried film.

12. A process according to claim 3 wherein the intermediate coating paint is a thermosetting intermedaite coating paint of organic solvent type or aqueous type containing, as a vehicle main component, a combination of (1) an oil alkyd resin having an oil length of 30% or less and/or an oil-free polyester resin and (2) an amino resin.

13. A process according to claim 3 wherein the film formed by the intermediate coating film has a thickness of 10 to 100 $\mu$ in terms of thickness of cured film.

14. A process according to claim 1 wherein the top coating paint is a paint capable of forming a tough-hard coating film.

15. A process according to claim 14 wherein the tough-hard coating film has an elongation at break of not more than 40% and a stress at break of at least 300 kg/cm$^2$.

16. A process according to claim 14 wherein the tough-hard coating film has an elongation at least of 5 to 30% and a stress at break of 350 to 1000 kg/cm$^2$.

17. A process according to claim 1 wherein the top coating paint is in a powder form.

18. A process according to claim 17 wherein the barrier coat contains a compatible solvent.

19. A pocess according to claim 1 wherein the barrier coat contains at leat one deterioration inhibitor for resins, selected from ultraviolet absorbers, photostabilizers and anti-oxidants.

20. A metallic substrate coated according to a process of claim 1.

21. A process according to claim 1, wherein the crosslinking hardenable resin in the barrier coating is selected from the group consisting of compositions comprising a polybutadiene or butadiene/acrylonitrile copolymer each having a number average molecular weight of about 10,000 to about 1,000,000 and containing a functional group at the terminals selected from amino, hydroxyl and carboxyl groups and a curing agent as main components and urethane-modified polyester resins having a hydroxyl value in the range of 20 to 100 obtained by increasing the molecular weight of polyester resins having a number average molecular weight of 500 to 10,000 through reaction with isocyanate compounds, and a crosslinking agent as main components.

22. The process of claim 1, wherein the top coating paint is an amino acryl resin paint comprising as a main component an acrylic resin containing an amino resin as a crosslinking agent or an amino alkyd resin paint comprising a thermosetting alkyd resin as a main component containing an amino resin as a crosslinking agent.

23. A process according to claim 1 which comprises applying an intermediate coating onto the barrier coat before applying the final top coating paint.

* * * * *